United States Patent
Akatsuka et al.

(10) Patent No.: US 6,577,249 B1
(45) Date of Patent: Jun. 10, 2003

(54) INFORMATION DISPLAY MEMBER, POSITION DETECTING METHOD USING THE SAME, APPARATUS AND METHOD OF PRESENTING RELATED INFORMATION, AND INFORMATION PRESENTING APPARATUS AND INFORMATION PRESENTING METHOD

(75) Inventors: Yuichiro Akatsuka, Tama (JP); Takao Shibasaki, Tokyo (JP); Akito Saito, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 149 days.

(21) Appl. No.: 09/688,925

(22) Filed: Oct. 16, 2000

(30) Foreign Application Priority Data

Oct. 19, 1999 (JP) ............................................ 11-296686
Oct. 27, 1999 (JP) ............................................ 11-305565
Oct. 28, 1999 (JP) ............................................ 11-307079

(51) Int. Cl.[7] .............................................. G08G 1/123
(52) U.S. Cl. ....................................... 340/988; 701/209
(58) Field of Search .............................. 340/988, 990, 340/995; 701/209, 211

(56) References Cited

U.S. PATENT DOCUMENTS 4,763,270 A * 8/1988 Itoh et al. .................... 340/988
5,381,095 A * 1/1995 Andrews ..................... 324/244
5,416,478 A * 5/1995 Morinaga ................... 340/988

FOREIGN PATENT DOCUMENTS

JP 6-197246 7/1994
JP 10-267671 10/1998

OTHER PUBLICATIONS

A. Takahashi et al; "A High Accuracy Realtime 3D Measuring Method of Marker for VR Interface by Monocular Vision"; 1996; pp. 167–172; 3D Image Conference '96.
U. Neumann et al; "Augmented Reality Tracking in Natural Environments"; 1999; pp. 101–130; Chapter 6, Vision-–Based Geometric Registration of Virtue.
M. Hirakawa et al; "Visual Interface", bit special issue, Kyoritsu Shuppan, pp. 177–198, 1996.

* cited by examiner

Primary Examiner—John Tweel
(74) Attorney, Agent, or Firm—Frishauf, Holtz, Goodman & Chick, P.C.

(57) ABSTRACT

An information display member has an information display face of its known size. On the information display face, a first pattern is displayed to represent coordinate information indicative of a position of the displayed information display member. On the information display face, a second pattern is displayed to represent direction information indicative of an direction in which the information display face is oriented. The information display face of the information display member is image-acquired by means of a camera, and an image is acquired. A direction in which the camera is oriented is obtained by a length ratio of aspect on the information display face mapped on the image and the direction information displayed on the information display face. A distance between the camera and the information display face is obtained by a size of the information display face mapped on the image. The position coordinate of the camera is obtained from the direction in which the camera is oriented the distance and the coordinate information displayed on the information display face.

41 Claims, 11 Drawing Sheets

"PRODUCT NAME : DIGITAL CAMERA"
"MANUFACTURING NUMBER : 99012345"
"DATE OF MANUFACTURE : 19990915"
"PRICE : 128,000 YEN"

PRODUCT NAME : DIGITAL CAMERA
MANUFACTURING NUMBER : 99012345
DATE OF MANUFACTURE : 19990915
PRICE : 128,000 YEN

"PRODUCT NAME:DIGITAL CAMERA",FONT:14,COLOR:BLACK
"MANUFACTURING NUMBER:99012345",FONT:10,COLOR:BLACK
"DATE OF MANUFACTURE:19990915",FONT:10,COLOR:BLACK
"PRICE:128,000 YEN",FONT:14,COLOR:RED

PRODUCT NAME:DIGITAL CAMERA
MANUFACTURING NUMBER:99012345
DATE OF MANUFACTURE:19990915
PRICE:128,000 YEN

INFORMATION DISPLAY MEMBER, POSITION DETECTING METHOD USING THE SAME, APPARATUS AND METHOD OF PRESENTING RELATED INFORMATION, AND INFORMATION PRESENTING APPARATUS AND INFORMATION PRESENTING METHOD

CROSS-REFERENCE TO RELATED APPLICATIONS

This application is based upon and claims the benefit of priority from the prior Japanese Patent Applications No. 11-296686 filed Oct. 19, 1999; No. 11-305565 filed Oct. 27, 1999; and No. 11-307079 filed Oct. 28, 1999, the entire contents of which are incorporated herein by reference.

BACKGROUND OF THE INVENTION

The present invention relates to an information display member such as an information display board on which information containing a position of an object is displayed, and to a position detecting method using the display member.

In addition, the present invention relates to a related information presenting apparatus and a related information presenting method for displaying information associated with an object in an image.

Further, the present invention relates to an information presenting apparatus and an information presenting method, and in particular to an information presenting apparatus and an information presenting method for presenting a user with information associated with an object of the user's interest.

For example, according to Jpn. Pat. Appln. KOKAI Publication No. 6-197246, there is disclosed that a two-dimensional bar code or the like is prescribed on a road sign, whereby information is automatically read by means of a bar code reader device comprising a CCD camera without a human being reading such road sign.

In addition, according to Jpn. Pat. Appln. KOKAI Publication No. 10-267671, there is disclosed associated information display technique as shown in FIG. 1 for the purpose of displaying information associated with an image from image input means.

In the associated information display technique, the following is described. That is, an approximate position during image acquisition caused by an image acquisition section (image acquisition apparatus) 51 is acquired from a position information acquisition section 52, and an angle is acquired by means of a camera attribute information acquisition section 53. Further, a view image of field of view that can be viewed from that position is created by using a computer graphics (CG) technique by means of a control section 58A based on three-dimensional map information from a map information management section 55. The thus created image is superimposed with label information from a label information creating section 56A by means of a label information output section 57A, whereby an input image and pattern matching are obtained.

However, in the aforementioned Japanese Patent Application Laid-open No. 6-197246 that is prior art, in a method of using a two-dimensional bar code, human readable language or sign information that an attached material of that code displays is merely replaced with code information in accordance with another standard such as existing bar code, is merely easily readable in view of image processing, and is not largely different from the identity of an inherent bar code.

That is, precise map information or position information on where it is or where a car is bound for is required for human navigation or navigation while driving a car. In this respect, the conventional information display and position and orientation recognizing method are not satisfactory.

In addition, in the associated information display technique disclosed in Jpn. Pat. Appln. KOKAI Publication No. 10-267671 that is prior art, it is required to reconstruct a view image in the field of view and obtain matching from a three-dimensional map containing information on height direction in order to determine associated information on superimposition.

Therefore, in this associated information display technique, there is a problem that much calculation time is required for the matching process, and it is difficult to identify a precise camera position (user position).

In the meantime, when an attempt is made to know a self position or direction, one always attempts to acquire visual information on periphery.

Nobody suspects this fact as long as he or she is an ordinary person.

When one moves to a land that he or she does not know well, one would attempt to know where he or she is based on tools such as a map or a compass or an astronomical position.

However, in the case where such process is performed automatically by means of an instrument in an image processing manner, non-visible position detecting means (such as GPS or gyrocompass) is avoidably used.

In addition, it is known that a method of obtaining a position and orientation of image input means from a reference mark position is disclosed in reference 1 "A High Accuracy Realtime 3D Measuring Method of Marker for VR Interface by Monocular Vision" (3D Image Conference' 96 Collection of Papers, pp. 167–172, Akira Takahashi, Ikuo Ishi, Hideo Makino, Makoto Nagasizu, 1996).

FIG. 2 shows a method of obtaining a position and orientation of the image input means disclosed in reference 1.

That is, in this method, in FIG. 2, when Oc is defined as a viewing point, 'po' is defined as a cross point of diagonal line of a projected image, and 'Po' is defined as a cross point of diagonal line for a rectangle, the orientation is obtained by obtaining x' such that the following equation is minimized.

$$F(x') = 4 - \sum_{i=1}^{4} (n_i n_i')^2$$

Here, a variable vector x' is x'=($\alpha_1$' $\beta_1$', $\alpha_2$').

With respect to a position, when "d" is estimated such that a distance from Ocpi and apex Pi is minimized by the minimum square method, the position is obtained by the formula below.

$$d = \frac{(S_o S_i)(S_i W_i) - (S_o W_i)}{1 - (S_o S_i)^2} D$$

Then, a position can be defined by obtaining an average of depth values obtained from each apex.

In addition, in reference 2 "Mixed Reality (ISBN 4-274-90283-8 Ohmsha, Ltd., Chapter 6: Augmented Reality Tracking in Natural Feature Environments, U. Neumann, S. You, Y. Cho, J. Lee and J. Park 1999 pp. 101–130), there is disclosed a technique of obtaining an initial position of image input means by using a known reference point called Fiducial Mark.

In this reference 2, a plurality of feature points are extracted, a projection position in an input image is obtained, and the feature points are tracked according to movement of the input device, whereby an optimal solution of the position of the image input means is obtained.

However, as disclosed in the aforementioned paper (reference 1) authored by Takahashi et al, the position and orientation of the image input means can be detected by the position coordinate of four corners of the reference mark itself. In the case where a distance between a camera and a mark is distance from each other, there is a problem that the projection distance in the field of view of four corners is reduced, and the detection precision is impaired.

In addition, using a large mark is often impractical.

In the aforementioned prior art disclosed in reference 2, it has been required to additionally record the known coordinate of a reference point or to provide a reference table between the reference point and the coordinate in order to obtain an initial position of the image input means.

Hence, in the case where the prior art disclosed in reference 2 is used in an area with its wide range or in the case where the prior art is used in a small terminal, there is a problem that a limited number of the coordinate can be recorded, and it takes long to obtain matching with the current extracted reference points from among a number of reference points, and thus, the prior art is used in a limited region, which lacks general purpose properties.

Conventionally, information presenting apparatuses for presenting information concerning on object of the user's interest in the real world for a user who is active in the real world include a portable information presenting apparatus composed of a liquid crystal display for presenting information to the user and a small video camera for acquiring peripheral images (Masato Hirakawa, Hisaaki Yasumura "Visual Interface", bit special issue, Kyoritsu Shuppan, pp. 177–198, 1996).

In this information presenting apparatus, useful information concerning an object that exists at the periphery is associated with a position at which an object exists, and is presented to user in the real world.

In this information presenting apparatus, an ID recognition color code (a kind of bar code in which ID is encoded by red and blue stripes) is appended by each object, and an image of an object including a color code acquired from a camera is transmitted to an image recognition section.

In this image recognition section, identification is performed on an object of the user's interest by decoding an ID number represented by a color code, and the identified object is transmitted to a message generating section.

In this message generating section, an identified ID is defined as a search key, and the corresponding information is searched from a database provided in advance. Then, a message generated based on this searched information is composed by means of an image composing section at a proper position on an image acquired from the camera, and the message is displayed on an information presenting display.

As an example of using such information presenting apparatus, when the user applies this apparatus in front of a calendar hanging on a wall, schedule information acquired from the database is considered to be composed and displayed on the calendar image.

In the aforementioned information presenting apparatus based on the prior art, an identification color code mounted to each object is identified, and an identification ID is defined as a search key. Then, the corresponding information is searched from the provided database, and the information to be composed and displayed is generated.

Therefore, in the aforementioned information presenting apparatus based on the prior art, it is required to provide an identification ID to each object. Further, there is a problem that information cannot be presented as long as a database is not provided by each identification ID.

BRIEF SUMMARY OF THE INVENTION

It is a first object of the present invention to provide an information display member employed when an attempt is made to know the self position and orientation or camera position and orientation using at least visual information, in other words, image information.

It is a second object of the present invention to provide a position detecting method in which a self position is conventionally determined in a known triangulation manner by employing this information display member, thus making it possible to eliminate a need to input the position coordinate of two points or the direction or orientation of the presence of the known landmark.

It is a third object of the present invention to provide an associated information presenting apparatus capable of determining associated information to be superimposed at a high speed and capable of obtaining its coordinate position by detecting a reference point.

It is a fourth object of the present invention to provide an associated information presenting method capable of determining associated information to be superimposed at a high speed and capable of obtaining its coordinate position by detecting a reference point.

It is a fifth object of the present invention to provide an information presenting apparatus capable of reliably presenting target information to a user even if there is no need to provide an identification ID by each object, and further, even if there is no database for storing all information to be displayed.

It is a sixth object of the present invention to provide an information presenting method capable of reliably presenting target information to a user even if there is no need to provide an identification ID by each object, and further, even if there is no database for storing all information to be displayed.

In order to achieve the foregoing first object, according to a first aspect of the present invention, there is provided an information display member having an information display face of its known size, the information display member comprising:

a first pattern displayed on the information display face in order to pattern and represent coordinate information indicative of a position of the information display member; and a second pattern displayed on the information display face in order to pattern and represent direction information indicative of a direction oriented on the information display face.

Operation

An information display face of the information display member is acquired by means of a camera, whereby the camera position information is acquired by the acquired image information based on a first pattern representing coordinate information indicative of a position of the information display member displayed on the information display face; and a second pattern representing direction information indicative of a direction oriented on the information display face.

On the information display face, there may be further represented a third pattern representing height information indicative of height of the information display member and a fourth pattern in which vertical and horizontal directions are represented to be patterned.

Operation

An information display face of the information display member is acquired by means of a camera, whereby camera position information is acquired from only acquired image information, and height information on the camera position is acquired based on: a first pattern presenting coordinate information indicative of a position of the information display member displayed on the information display face; a second pattern representing direction information indicative of direction oriented on the information display face; a third pattern representing height information indicative of height of the information display member; and a fourth pattern representing the vertical and horizontal directions.

In order to achieve the aforementioned second object, according to a second aspect of the present invention, there is provided a position detecting method, comprising the steps of:

acquiring an image by acquiring the information display member displayed on the information display face with a camera by a first pattern for patterning and representing coordinate information indicative of a position an information display member having an information display face of its known size and a second pattern for patterning and representing direction information indicative of a direction oriented on the information display face;

obtaining a length ratio of aspect on the information display face mapped on the image and a direction in which the camera is oriented from direction information displayed on the information display face;

obtaining a distance between the camera and the information display face from the size of the information display face mapped on the image; and obtaining the position coordinate of the camera from the direction in which the camera is oriented, the distance, and the coordinate information displayed on the information display face.

In the case of the above information display member, there are further displayed on the information display face a third pattern for patterning and representing height information indicative of height of the information display member; and a fourth pattern for patterning and representing the vertical and horizontal directions of the information display member, wherein the position detecting method may further comprise the steps of: obtaining height information displayed on an information display face mapped on the image; and obtaining the height of the camera from the height information and an elevation angle of the camera.

In order to achieve the third object, according to a third aspect of the present invention, there is provided an associated information presenting apparatus for superimposing and displaying the associated information on each section of the object at the corresponding position on an image on which an object is image-acquired, the associated information presenting apparatus comprising:

an image input section for including in the range of image acquisition a mark on which a pattern representing position information on four points or more of the object is displayed, and inputting an image in which the object is image-acquired;

a position information management section for reading the pattern from an image inputted by the image input section, and acquiring the position information;

a position information acquisition section for obtaining the position and orientation of the image input section from acquired position information acquired by the position information management section;

an associated information generating section for obtaining the position of each section of the object on the image based on the position and orientation of the image input section obtained by the position information acquisition section; and an information superimposing and displaying section for superimposing and displaying the associated information at the corresponding position based on a position on the image obtained by the associated information generating section.

In order to achieve the fourth object, according to a fourth aspect of the present invention, there is provided a method for superimposing and displaying associated information on each section of the object at the corresponding position on an image on which an object is image-acquired, the method comprising the steps of:

including in the range of image acquisition a mark on which a pattern representing position information on four points or more of the object is displayed, and inputting an image on which the object is image-acquired by an image input section;

reading the patter, thereby acquiring the position information;

obtaining the position and orientation of the image input section from the position information;

obtaining the position of each section of the object on the image based on the position and orientation of the image input section; and superimposing and displaying the associated information at the corresponding position based on the position on the image.

In order to achieve the foregoing object, according to a fifth aspect of the present invention, there is provided an information presenting apparatus, comprising:

an image input section for inputting an image;

a pattern recognition section for recognizing a pattern representing information on an image inputted by the image input section;

an information reproducing section for representing information represented by a pattern recognized by the pattern recognition section;

an image superimposing section for superimposing information reproduced by the information reproducing section on an image inputted by the image input section; and an image display section for displaying an output from the image superimposing section.

In order to achieve the sixth object, according to a sixth aspect of the present invention, there is provided an information presenting method comprising the steps of:

inputting an image;

recognizing a pattern representing information on an input image;

reproducing information representing a recognized pattern;

superimposing reproduced information on the input image; and displaying an image on which the reproduced information is superimposed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
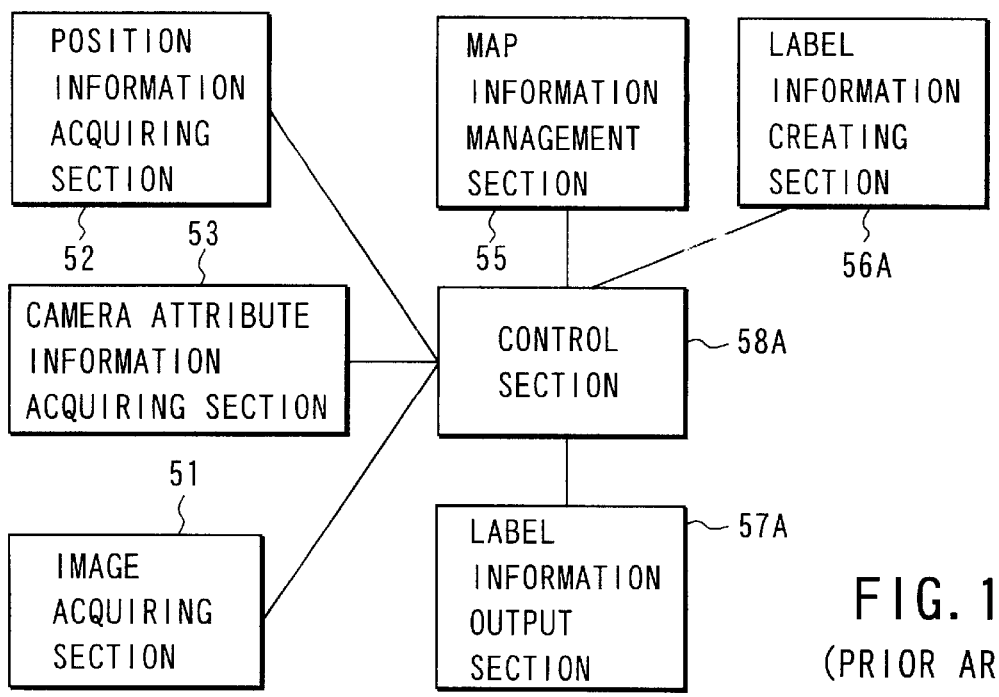
FIG. 1 is a block diagram illustrating prior art for displaying information associated with an image from an image input section.

Reference will now be made in detail to the presently preferred embodiments of the invention as illustrated in the accompanying drawings, in which like reference numerals designate like or corresponding parts.

Hereinafter, embodiments of the present invention will be described with reference to the accompanying drawings.

First Embodiment

Figures 2A, 2B:
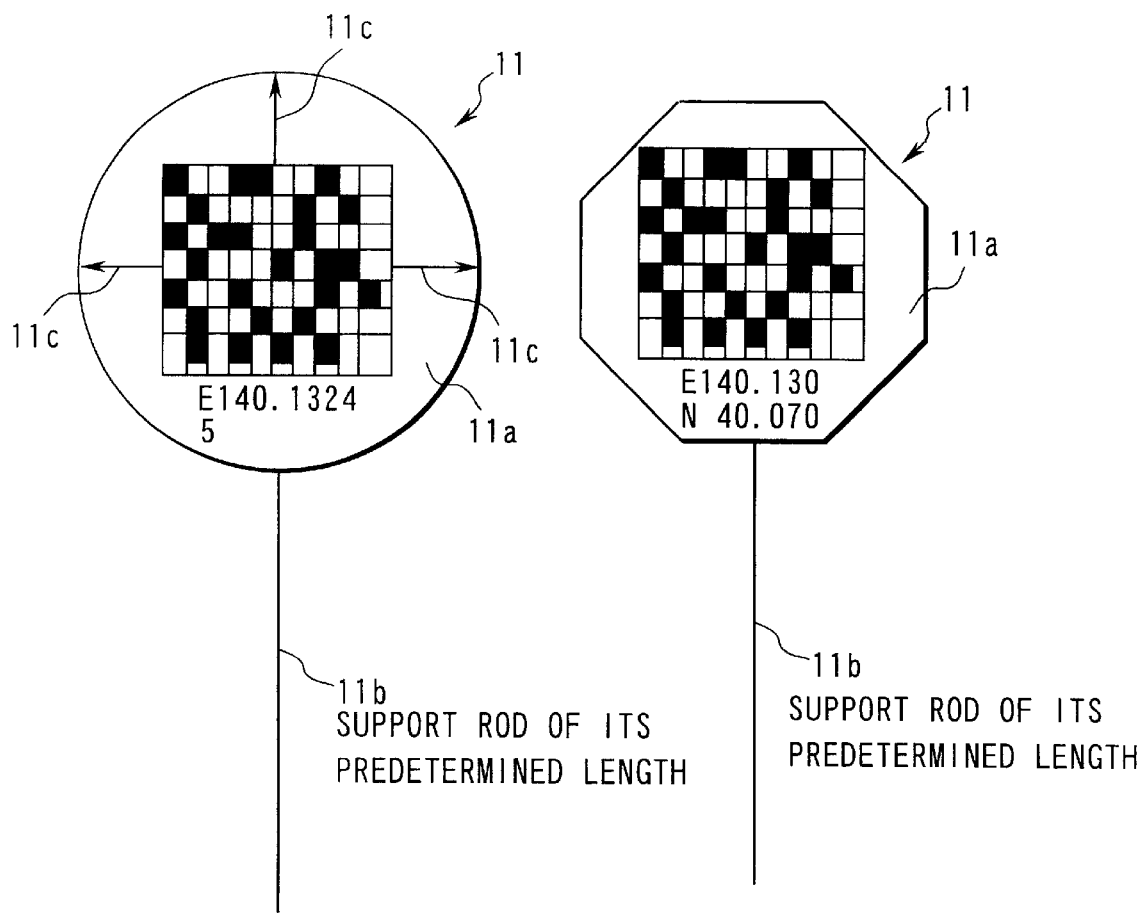
FIG. 2A and FIG. 2B are views each showing a configuration of an information display member according to a first embodiment of the present invention.

FIG. 2A and FIG. 2B are front views each showing an information display member 11 according to a first embodiment.

This information display member 11 according to the first embodiment is formed in a flat plate shape or curved face plate shape expressing patterned information using, for example, a combination of a geometrical shape and a combination of colors. The information display member 11 comprises: an information display face 11a on which spatial position information and direction information are contained in the contents of the patterning and representing information; and a support rod 11b having its predetermined length for supporting the information display face 11a as follows.

In FIG. 2A and FIG. 2B showing in the first embodiment of the present invention, for example, a disc shaped or octal disc shaped display plate (hereinafter, information display member) 11 is set by inserting a support rod 11b on the ground, and erecting the support bar at a predetermined position B (shown in FIG. 3) such as a road and when its opposite orientation is defined as south.

On the information display face 11a of this information display member 11, coordinate information indicative of a position of a setup site and direction information indicative of a direction oriented on the information display face 11a are displayed in a geometrical shape as illustrated, for example, in a patterned shape in which a rectangular lattice is basically formed based on a language in accordance with a predetermined rule representing these items of information.

A user that exists at a position A (shown in FIG. 3) at which this information display member 11 can be seen acquires an image on the information display face 11a of the information display member 11, for example, by means of an electronic camera.

At this time, assume that the camera captures the information display face 11a of the information display member 11 at the almost center of the image acquisition screen, and the horizontal and vertical image angles of the camera are at angles of p and q, respectively.

Assuming that the size in the screen of the information display member 11 captured at the vicinity of the almost center of the image acquisition screen for the camera corresponds to a horizontal image angle of S, and corresponds to a vertical angle of T. (S and T are not shown in the drawings.)

That is, in this case, a direction oriented by a camera, that is, a user can be computed based on an S/T ratio and mapping information on a lateral direction display (for example, east, west, south, north or EWSN) that is direction information indicative of a direction oriented on the information display face 11a patterned and displayed on the information display face 11a of the information display member 11.

For example, if the S/T is 0.5, an angle of ±60 degrees from the south of the information display member 11 (4 'O clock or 8 'O clock direction) is a direction in which the camera, that is, the user is oriented.

The lateral direction display that is patterned to be displayed on the information display face 11a of the information display member 11 can be seen on the front side face, whereby E in which the front side face indicates the east side or a sign indicating a predetermined direction can be read.

That is, in this case, a 4 'O clock direction of the information display member 11 can be identified, and an 8 'O clock direction can be identified if it indicates the west side.

In this way, a camera position from an acquired image of the information display face 11a of the information display member 11, that is, a direction from the information display member 11 at the user's position is specified.

Next, a distance AB between a setup position B of the information display member 11 and a current position A of the user can be obtained from a vertical image angle for the camera image acquisition screen, an image angle of T (not shown) for the information display member 11 mapped on the angle, and the diameter of preset information display member 11 (in this case, 1 m is set):

$$AB = 0.5 / \tan(T/2)$$

How to specify a direction from the information display member 11 at these user's positions and how to obtain the distance AB between the setup position B of the information display member 11 and the user's current position A will be described with reference to FIG. 3 and FIG. 4.

As shown in FIGS. 2A and 2B, the information display member 11 according to the present invention is set, for example, a geometrical shape, in a disc or rectangular shape of its predetermined size displaying information containing detailed latitude and longitude up to meter order described in accordance with a predetermined language on the information display member 11 for patterning information on which a rectangular lattice is basically formed, opposite orientation of the information display member, or height.

At this time, the patterning information is multiply colored, thereby making it possible to display information on higher density.

However, in this case, coloring of an implementation system is indispensable.

Figure 3:
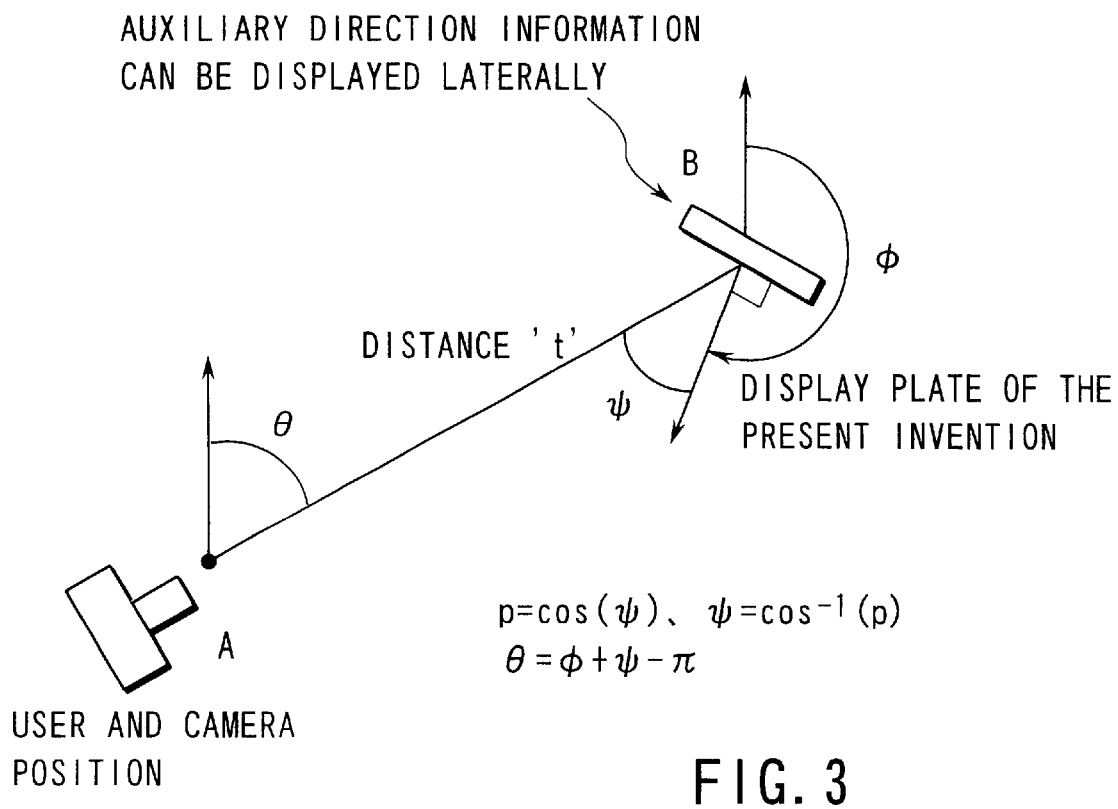
FIG. 3 is a view illustrating functions of the information display member according to the first embodiment of the present invention.

Here, as shown in FIG. 3, assume that the position of an electronic camera that the user has is defined as A, and its direction is defined as an angle of θ relative to north.

Further, when the information display member 11 according to the present invention is set to a position B distant from the user by distance 't', and a direction of an angle φ relative to north is oriented, assuming that a ratio of a horizontal external diameter relative to a vertical external diameter of the information display member 11 is defined as 'p' viewed from a camera that the user has, the following is obtained:

$$p = \cos(\psi)$$

Therefore, $\psi = \cos^{-1}(p)$ (provided if $\psi > 0$) can be obtained.

Thus, a direction in which the camera is oriented can be described as $\theta = \phi + \psi$. Further, one solution relative to the above 'p' can be given by the known value of φ based on information on the information display member 11 and orientation information on the side face of the information display member 11 (indicated by information on which a direction in which the side face is oriented is patterned complementarily on the side face of the information display member 11 or alphabetic letters EWSN).

Figure 4:
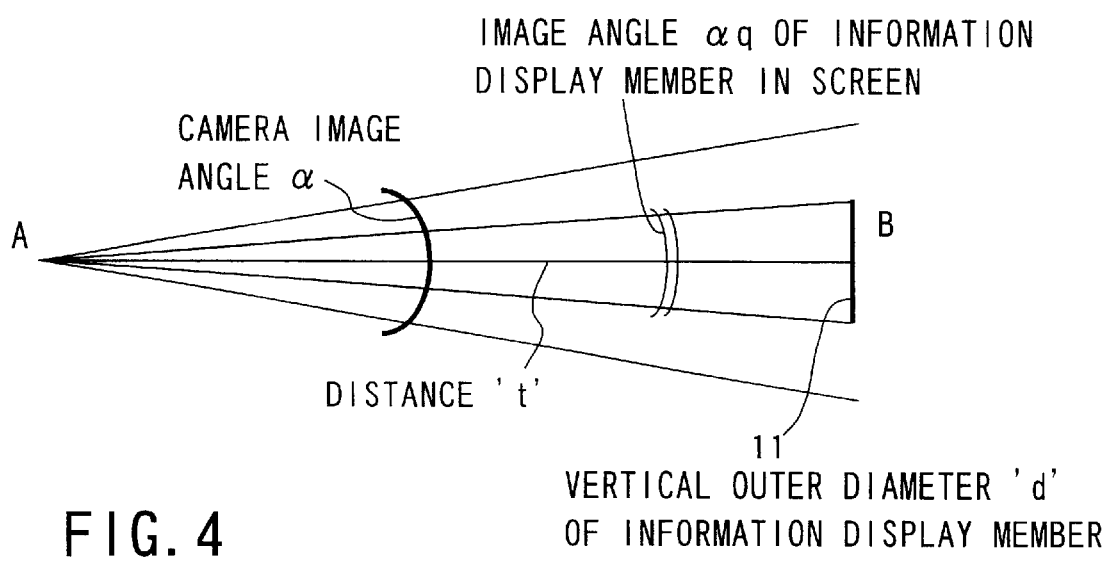
FIG. 4 is a view illustrating functions of the information display member according to the first embodiment of the present invention.

Further, as shown in FIG. 4, when a viewing image angle of the camera at a position of A is defined as α, and when a ratio of an image angle in the field of view of the information display member 11 at a position of B mapped near the center of the screen is defined as "q", the outer diameter of the information display member 11 is defined as "d", and a distance between AB is defined as "t", $d/2t = \tan(\alpha q/2)$ is obtained. Thus, "t" is given by $t = d/2 \tan(\alpha q/2)$.

The position coordinate (universal coordinate, latitude and longitude) of the information display member 11 itself is obtained from the patterning information on the information display member 11 itself based on a relative distance and a relative direction between the thus obtained information display member 11 and the user, whereby the position coordinate of the user or camera can be determined.

Further, the first one digit of the patterned and displayed information on the information display member 11 itself is distributed in the longitude east and west section, and the subsequent eight digits are distributed in the expression of the longitude integer section, and further, the subsequent seven digits are distributed in the expression below decimal point of longitude.

Further, behind some digits representing the expression of latitude including specific symbols, as in the case of the expression of longitude, the first one digit of the patterned and displayed information on the information display member 11 itself is distributed in the latitude north and south section, and the subsequent seven digits are distributed in the expression of the latitude integer section, and further, the subsequent seven digits are distributed in the expression below decimal point of latitude.

Of course, a language of patterned and displayed information on the information display member 11 itself is arbitrarily set as long as the universal coordinate can be specified. It is optional that the number of digits digitally expressed is increased and decreased according to precision of expression and that digits of read error correction are provided with respect to the patterned and displayed information.

However, of course, in the case where information is provided to a specific user or is widely provided with general-purpose properties, it is required to generalize a language of patterned and displayed information on the information display member 11 itself.

Here, as described above, an absolute position (universal coordinate) of a user relative to the information display member 11 can be specified from three types of information such as a direction relationship with the information display member 11, a relative distance with the information display member 11, and an absolute position (universal coordinate) of the information display member 11 itself.

In addition to patterning information on the information display member 11 or instead of patterning information expression, spatial position information (universal coordinate, latitude and longitude, height) or opposite direction of the information display member, and horizontal and vertical dimensional display of the information display member may be performed on the information display member by using alphabetical letters and/or Japanese expression.

That is, alphabetical letters or Japanese expression is used in place of reading patterning information or in addition to patterning information expression, whereby the user can directly understand information indicative of the information display member on camera finder or camera monitor without adding image processing.

Further, in the case where image processing is provided with a literacy function, it is possible to perform the above position estimation by using the function or it is possible to provide a function for error correction of patterning information.

In addition, as shown in FIG. 2A, the direction display information 11c on which the vertical upward or downward direction, horizontal direction, and orientation are displayed in the information display face 11a of the information display member 11 is employed, thereby making it possible to estimate an elevation angle of the image acquisition apparatus and obtain a height difference between the projection position and the display plate from the computed distance information.

Second Embodiment

Figures 5A, 5B:
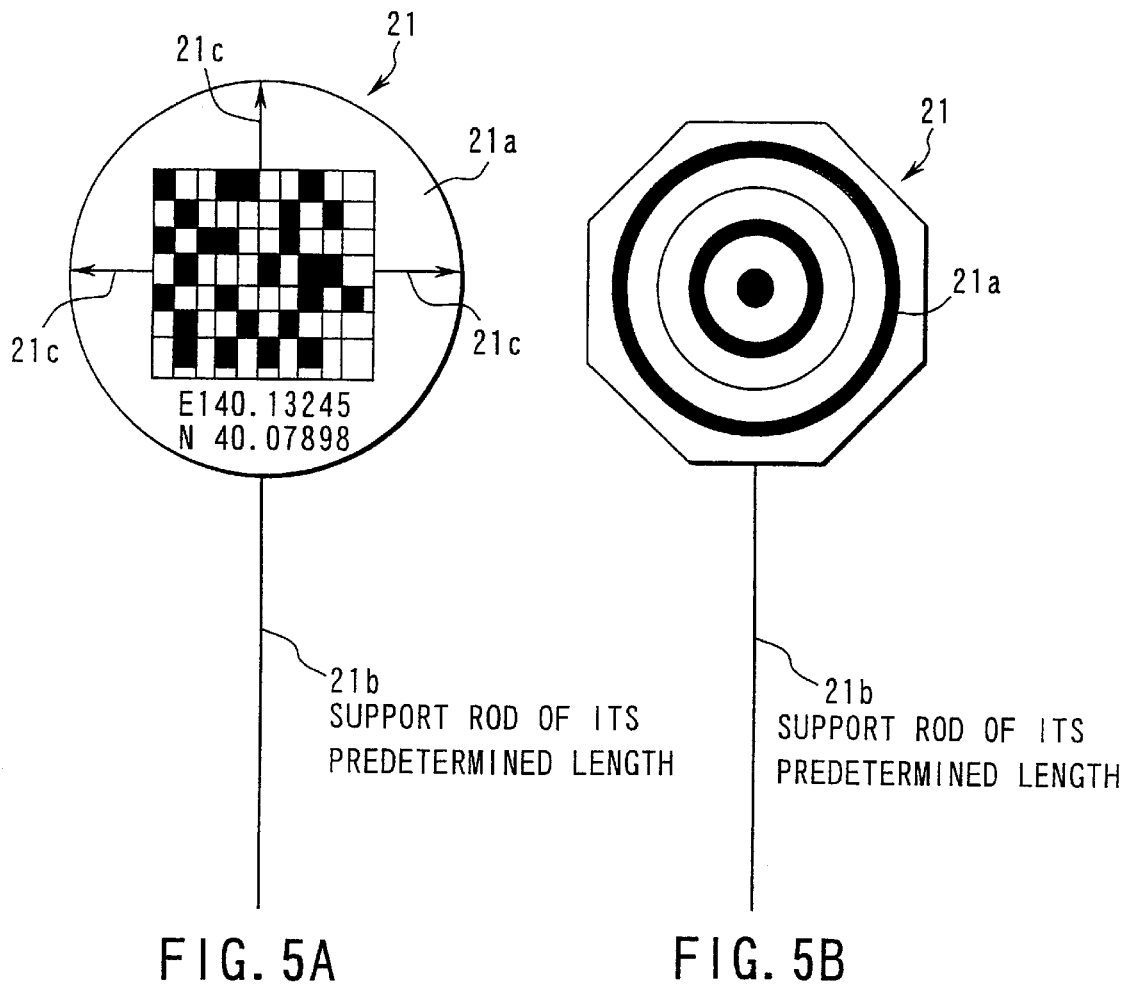
FIG. 5A and FIG. 5B are views each showing a configuration of an information display member according to a second embodiment of the present invention.
Figure 6:
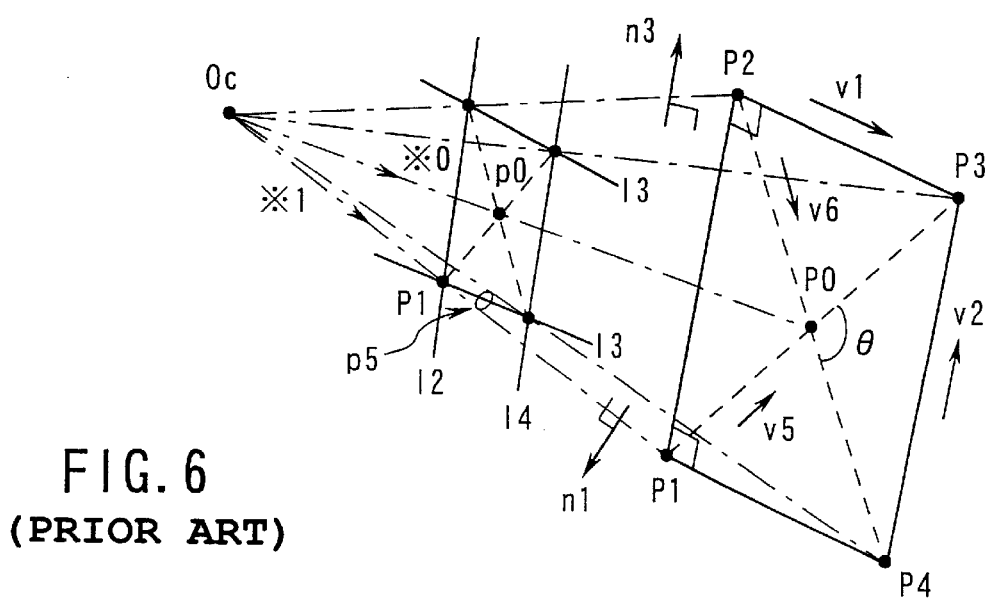
FIG. 6 is a view illustrating a method of obtaining the position and orientation of an image input section disclosed in reference 1.

FIG. 5A and FIG. 5B are front views each showing an information display member 11 according to a second embodiment of the present invention.

In this second embodiment, there is employed an information display member 21 with its pattern in which a combination of the geometrical shapes of the information display member 11 mainly expresses binary numbers.

That is, as shown in FIG. 5A, in the case where a zigzag lattice shaped patterning information expression is employed, and further, as shown in FIG. 5B, in the case where concentric patterning information expression is employed, it is set that the monochrome intensity expresses a digit 1 or 0.

In this way, the information display member 21 based on binary expression patterning information is employed, thereby making it possible to facilitate image computerization processing and to facilitate compatibility between implementation systems according to the present invention relative to another patterning information reader.

As shown in FIG. 5A, the vertical upward or downward direction in the information display face 21a of the information display member 21 supported by a support rod 21b and the direction display information 21c on which horizontal direction and orientation are displayed are employed, thereby making it possible to estimate an elevation angle of the image acquisition apparatus and to obtain a height difference between the image acquisition position and the display plate from the already computed distance information.

Modified Example

As a first modified example, information display members 11 and 21 according to the first and second embodiments are configured by employing electronic display units such as LCD or CRT (including LED display unit, plasma display, CRT, or LCD that are relatively easily implemented), thereby making it possible to edit and control the display contents from a distant site.

Further, in the case where a rotary mechanism is added to the information display faces 11a and 21a of the information display members 11 and 21, a control mechanism for changing the direction information on the information display member with an elapse of time is added according to its rotation.

In addition, weather or any other news information as well as position and orientation information can be displayed.

As described above, the above information display member is directed to an information display member comprising an information display face of its known size. In this information display member, the coordinate information indicative of a position of the above information display member and direction information indicative of a direction in which the above information display face is oriented are displayed on the above information display face by means of a pattern representing these items of information.

Such information display member is image-acquired by means of a camera, making it possible to know a position of the camera based on image information only.

In addition, the above coordinate information is defined as latitude and longitude, application to GPS is facilitated.

On the above information display face, assuming that a pattern representing height information indicative of the height of the above information display member and a pattern representing vertical and horizontal directions are displayed, the height of the position of a camera that image-acquires these patterns can be obtained.

In the above patterns, when information is expressed by disposing a region with its two different intensities, information obtained from such information display member can be easily processed by a computer.

In addition, a character of the above pattern or a character describing information represented by the above pattern is displayed with the above pattern, whereby the information obtained from such information display member is displayed to be easily understandable to a human being.

The above information display face has a side face section, and information indicative of a direction oriented at the above side face section is displayed, whereby a direction can be uniquely determined from the information obtained from such information display member.

An information display member comprising an information display face of its known size, which has coordinate information indicative of a position of the information display member and direction information indicative of a direction oriented on the information display face displayed on the information display face in a pattern representing these items of information, image-acquires by a camera so as to obtain an image; a length ratio of aspect for the above information display face mapped on the above image and a direction in which the camera is oriented from the direction information displayed on the information display face are obtained; a distance between the camera and the information display face is obtained from the size of the information display face mapped on the image; and the position coordinate of the camera is obtained by the direction in which the camera is oriented, the distance, and the coordinate information displayed on the information display face, whereby a position detecting method is achieved.

On the above information display face, an information display member in which a pattern representing height information indicative of the height of the information display member and a pattern representing vertical and horizontal directions is further image-acquired by means of a camera so as to acquire an image, the height of the camera is obtained from the height information displayed on the information display face and an elevation angle of the camera, whereby a position detecting method is achieved.

The information display member is formed in a flat plate shape or a curved face plate shape in which patterning information is expressed by using a combination of geometrical shapes or combination of colors, as shown in a first embodiment, and spatial position information or direction information itself may be contained in the contents of the information on which patterning is expressed.

The present invention is implemented, thereby obtaining:
(1) opposite direction on the display plate from code information on an information display member (applicable to a back face) and schematic direction on the side face of the information display member;
(2) universal coordinate or longitude and latitude of the display plate from code information on the information display member;
(3) nominal angle of the information display member that is an object from the user's known camera information and an image angle of the camera itself;
(4) predetermined diameter or aspect dimensions of the predetermined information display member or diameter or aspect dimensions displayed in code information on the information display member;
(5) horizontal and vertical ratio of the external shape of the information display member on an image acquired (inputted) by the camera; or the like.

By using the information on above (1) and (5), the orientation in which the user or camera (other than extreme) is oriented can be estimated.

In addition, by using the information on the above (3) and (4), a distance between the user or camera and the information display member can be computed.

Further, the universal coordinate or latitude and longitude can be estimated from the information on the above (2), a direction in which the aforementioned user or camera is oriented and a distance between the information display plates.

As shown in the first embodiment, the outer frame or external dimensions of the information display member itself and a combination of geometrical patterns that denote the information display member position expressed on the information display member are image-acquired; and a distance is computed from a ratio of the real size of the known information display member, an image angle of the image acquisition apparatus, and the size in the image of the information display member, thereby making it possible to achieve a position and orientation detecting method capable of knowing the image acquisition position.

The present invention is basically directed to a position detecting method using the above information display member. In addition, the meaning of information display is provided at the external shape of the information display member or the shape or pattern of the outer frame; slight thickness is provided at the horizontal and vertical dimensions of the information display member itself or on side face of the information display member; and a direction is displayed thereon, thereby making it possible to provide reliable position information.

In addition, in the above information display member, as shown in the first embodiment, a combination of the above geometrical shape is mainly expressed in binary number.

By using the binary expressed patterning information, image computer processing can be facilitated, and compatibility between the other patterning information reader and the implementation system according to the present invention can be facilitated.

The above information display member is composed of an electronic display body as shown in the first modified example, and display patterning information can be freely changed by electrical signal operation.

In addition to the above position information, an electronic display unit is employed as the information display member in consideration of a user from a direction in which direction information is comparatively hardly acquired, this unit is rotated during a predetermined period (with an irregular period being applicable), whereby direction information on the information display member is changed according to this rotation angle. Occasionally, the change (rewrite) rule itself is displayed on the information display member, thereby making it possible to estimate the user or camera direction information more precisely.

In this case, although the nominal horizontal and vertical ratio of the information display member is utilized for estimating a direction, one solution of such direction estimation can be easily obtained by specifying a rotational direction.

Further, it is possible to additionally describe news information for the information display member or to intentionally apply restriction to position precision.

As shown in the modified example of the first embodiment, in the above information display member, spatial position information and/or direction information on the information display member is composed of alphabetical letters, numeric data, Japanese language or expression of language used in the country indicative of longitude, latitude, direction, height, size of the information display member or the like.

Alphabetical letters, Japanese language or expression of language used in the country are used in place of reading patterning information or in addition to expression of patterning information, thereby making it possible for a user to directly understand information indicated by the information display member on a camera finder or camera monitor without adding image processing.

Further, in the case where image processing is provided with a literacy function, it is possible to perform the above position estimation using the function and to provide a patterning information error correction function.

As shown in each of the modified examples of the first and second embodiments, in the position and orientation detecting method, the display information on which the vertical upward or downward directions and the horizontal direction and orientation are displayed in the information display face of the information display member is used, whereby an elevation angle of the image acquisition apparatus is estimated, and a height difference between the image acquisition position and the display plate is obtained from the already computed distance information.

In the present invention, a comparative height difference with the height of the information display member is obtained based on a vertical upward or downward display mark on the information display face in the information display member; and a distance between the user or camera and the information display member obtained from the measurement of the camera elevation angle (not shown) in the above first embodiment, and the user or camera height is estimated.

The present invention is implemented, thereby making it possible to make universal coordinate correction or estimate the camera height.

Therefore, as has been described above, according to the first and second embodiments of the present invention and modified examples thereof, when the user attempts to know the self position and orientation by using only image processing means, an image is acquired by means of an image input device integral with a car that the user has or on which the user rides, whereby an information display member capable of obtaining information on which the self position and orientation can be detected and a position detecting method using the same can be provided without a need for recognizing a sign of two points in triangulation manner.

Third Embodiment

Figure 7:
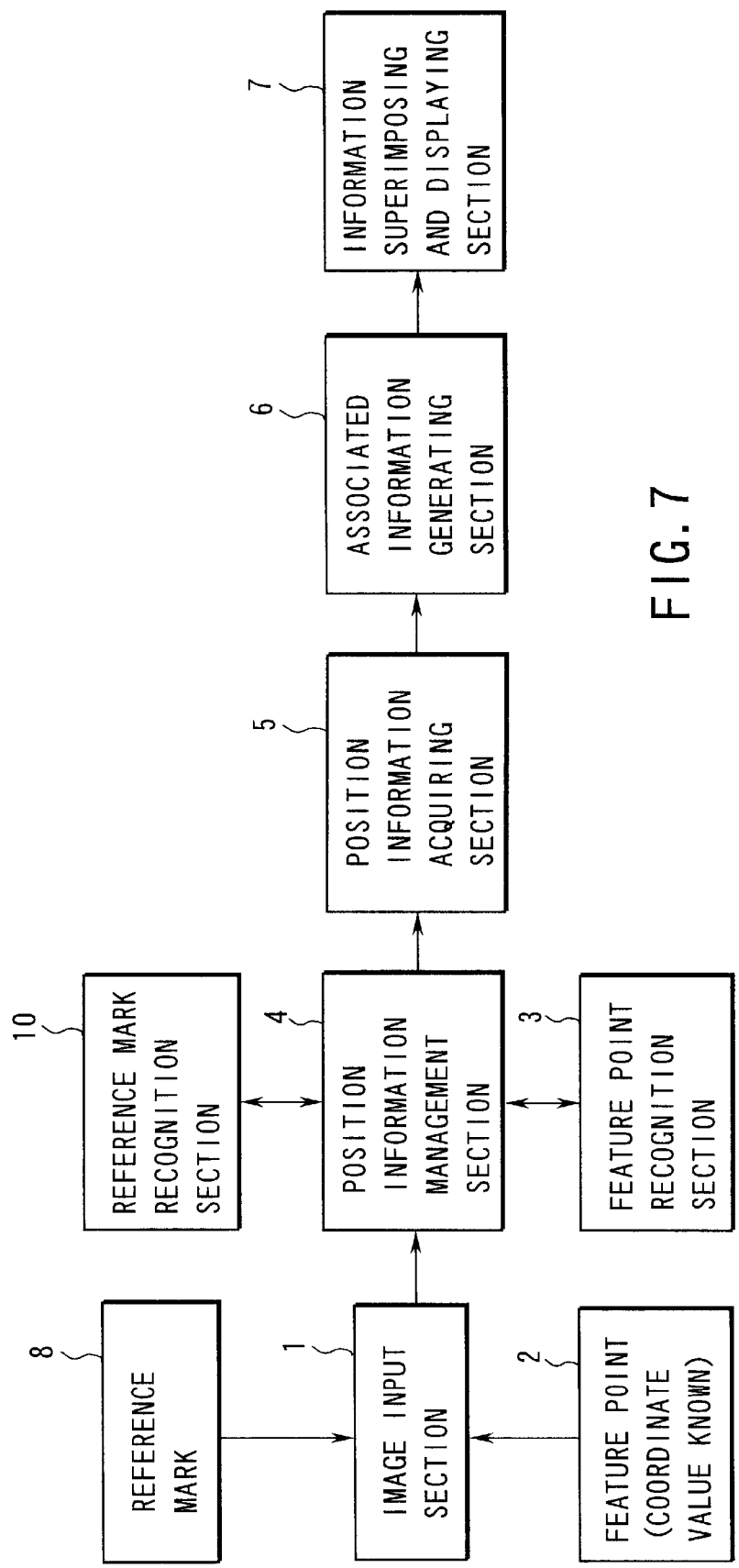
FIG. 7 is a block diagram showing a configuration of an associated information presenting apparatus according to a third embodiment of the present invention.

FIG. 7 is a block diagram depicting a configuration of an associated information presenting apparatus according to a third embodiment of the present invention.

As shown in FIG. 7, the associated information presenting apparatus according to the third embodiment is composed of an image input section 1, a feature point 2, a feature point recognition 3, a position information management section 4, a position information acquisition section 5, an associated information generating section 6, an information superimposing and displaying section 7, a reference mark 8, and a reference mark recognition section.

In this associated information presenting apparatus, the position information management section 4 checks whether or not the reference mark 8 for indicating position information or the like in an input image is present based on image data inputted by the image input section 1.

A pattern or two-dimensional pattern is utilized as this reference mark 8.

Data of several bytes to some thousands of bytes can be recorded in the reference mark 8 utilizing these patterns or two-dimensional pattern.

Position information recorded in this reference mark 8 is defined by a method represented by a latitude called universal coordinate or a method in which an origin is determined in the apparatus use range to define a coordinate system.

Here, in the case where a latitude and a longitude are employed as position information recorded in the reference mark 8, for example, 0.001 second is defined as about 3 cm in the vicinity of Tokyo. In the case where precision of such extent is required, about 10 bytes will suffice.

In addition, with respect to a direction in which the reference mark 8 is oriented, the direction can be expressed by three angles of yaw, pitch, and roll (a total of 6 bytes).

By these angles, the position information recorded in the reference mark 8 is recorded in 16 bytes by setting an angle whose reference is north and horizontal in accordance with the latitude and longitude, whereby the position at which the reference mark 8 is placed or the direction in which the mark is oriented can be recorded.

The reference mark 8 having such patterned position information or the like recorded therein is recognized as a mark 8 in an input image from the image input section 1 by the mark recognition means 10.

That is, a mark recognition section 10 acquires position information on the mark contained in the recognized mark.

The position information management section 4 performs association with the mark, and acquires position information corresponding to the feature point (2) in the screen recognized by means of the feature point recognition section 3.

Then, the position information management section 4 records the coordinate data on a plurality of feature points 2 extracted in the vicinity of the reference mark 8 in accordance with the acquired data of the reference mark 8.

These feature points 2 is directed to outstanding points such as cross points, brightness, coloration or the like of line sections in an image in which the coordinate position is known.

Specifically, an acquired image is subject to differentiation processing or hair stroke processing, and further, is set by threshold values, thereby the feature point 2 can be extracted.

Figure 8:
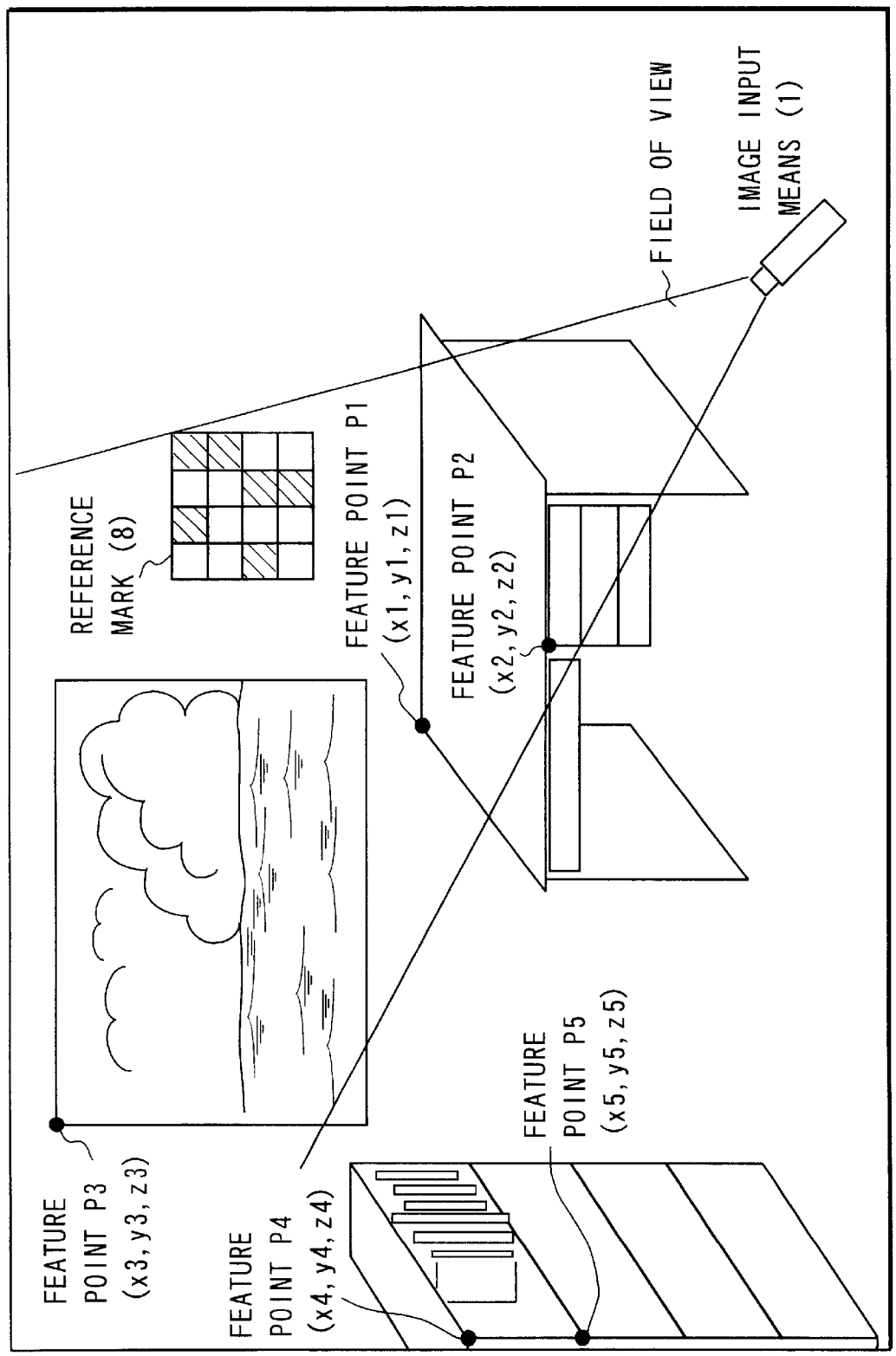
FIG. 8 is a schematic view showing features employed in the associated information presenting apparatus according to the third embodiment of the present invention.

FIG. 8 schematically shows these feature points.

That is, in FIG. 8, there is shown a case in which feature points P1, P2, P3, P4 and P5 as well as reference mark 8 are present.

Here, with respect to the reference mark 8, the position and orientation information is recorded as described above.

In addition, with respect to the feature points P1, P2, P3, P4 and P5, the respective positions (x1, y1, z1), (x2, y2, z2), (x3, y3, z3), (x4, y4, z4), and (x5, y5, z5) are measured in advance, and are recorded in the reference mark 8.

In this case, the data of a total of 66 bytes is recorded in the reference mark 8.

Therefore, a two-dimensional pattern whose capacity is several thousands of bytes is employed as a reference mark 8, whereby these items of data can be easily recorded and reproduced.

In FIG. 8, the image input section 1 places the reference mark 8 and the feature points P1, P2, P3, P4 and P5 in the field of view.

Here, information on the reference mark 8 is read by the position information management section 4, whereby the position and orientation of the reference mark 8 and the position coordinate of the feature points P1, P2, P3, P4 and P5 are identified.

The information on these position and orientation and feature points is stored in the position information management section 4 as described above.

Then, the position information acquisition section 5 computes the position and orientation of the image input section 1 from the feature points whose positions are known, as disclosed in prior art.

In addition, the orientation of the reference mark 8 is known, and thus, the orientation in the universal coordinate of the image input section 1 can be obtained.

In this manner, associated information to be superimposed and displayed in the field of view is generated by employing the associated information generating section 6 using the obtained position and orientation information on the image input section 1. The associated information can be superimposed and displayed at a predetermined position in an image by means of the information superimposing and displaying section 7.

Here, the associated information to be superimposed and displayed includes instructions or explanation on the positions of building or landscape, explanation of mechanical facilities in the field of view or the like.

These items of information should be superimposed at the position of an object of information (such as building or landscape, mechanical facilities or the like) or displayed in the vicinity of the periphery.

These items of information to be superimposed are stored in advance in the associated information generating section 6.

In addition, the information superimposing and displaying section 7 includes a CRT or LC, or a head mounting type HMD or portable type PDA and the like.

Figure 9:
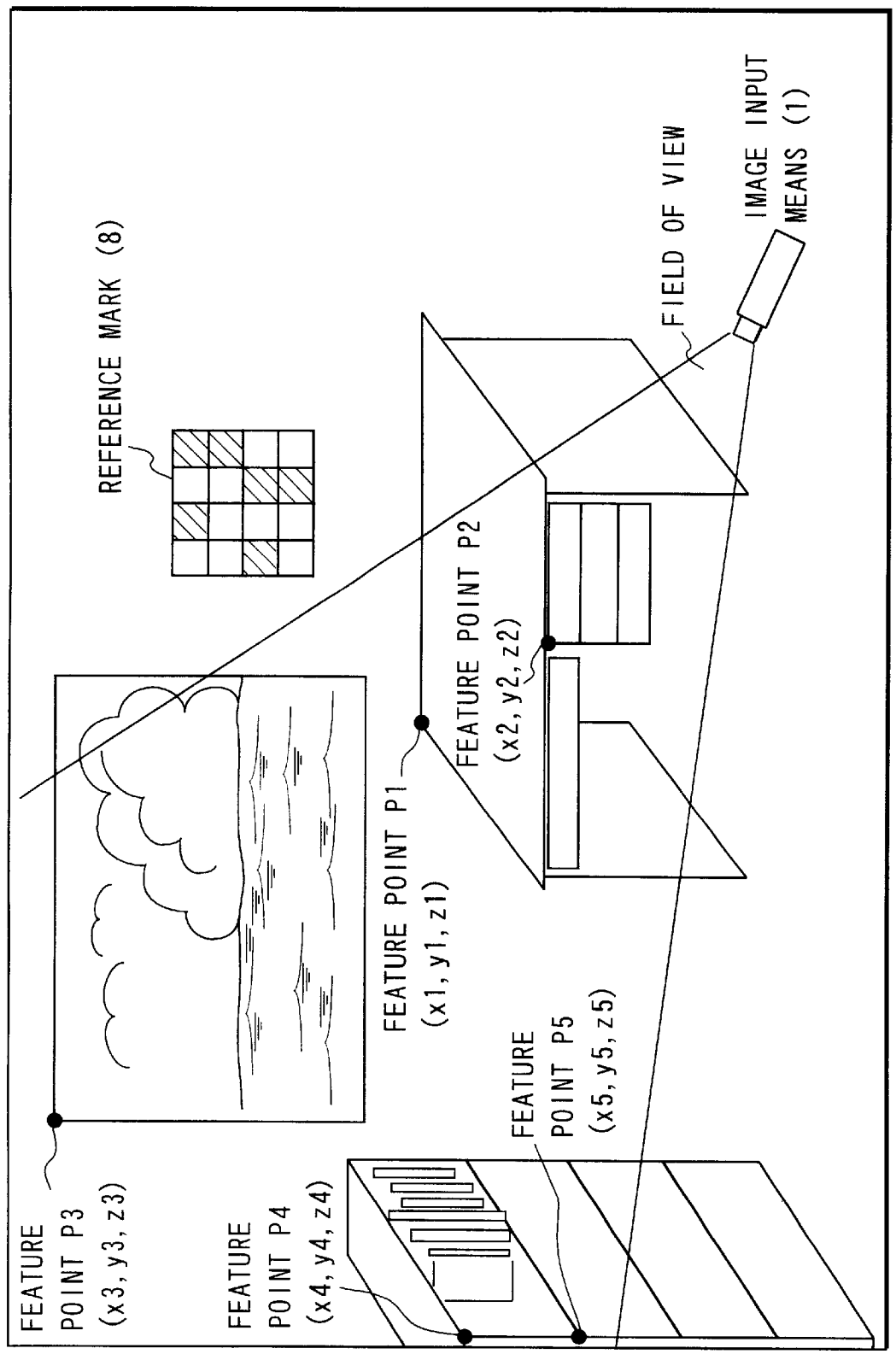
FIG. 9 is a view illustrating an operation of the associated information presenting apparatus according to the third embodiment of the present invention.

Next, in this state, when the image input section 1 is moved and rotated as shown in FIG. 9, the positions of reference mark 8 projected in two-dimensional manner in the field of view and the feature points P1, P2, P3, P4 and P5 change, and the positions at which the associated information is to be superimposed and displayed move.

In this example, although the feature points P1, P2, P3, P4 and P5 are within the field of view, the position and orientation of the image input section 1 can be obtained from the position projected in the same manner as the above and the universal coordinate of the feature points read from the reference mark 8 and stored in the position information management section 4, and the associated information can be superimposed and displayed continuously in the same manner as the above.

At this time, even in the case where the reference mark 8 comes out of the field of view, if four or more feature points are present in the field of view, the position and orientation of the image input section 1 can be obtained.

In the case where these feature points may be two-dimensional patterns similar to the reference mark 8 or patterns analogous thereto, the feature points include information representing the shapes of building or mountain and the like. These patterns are recognized, thereby making it possible to reconstruct the shape of an object and to display and superimposed as associated information in an image.

Fourth Embodiment

Figure 10:
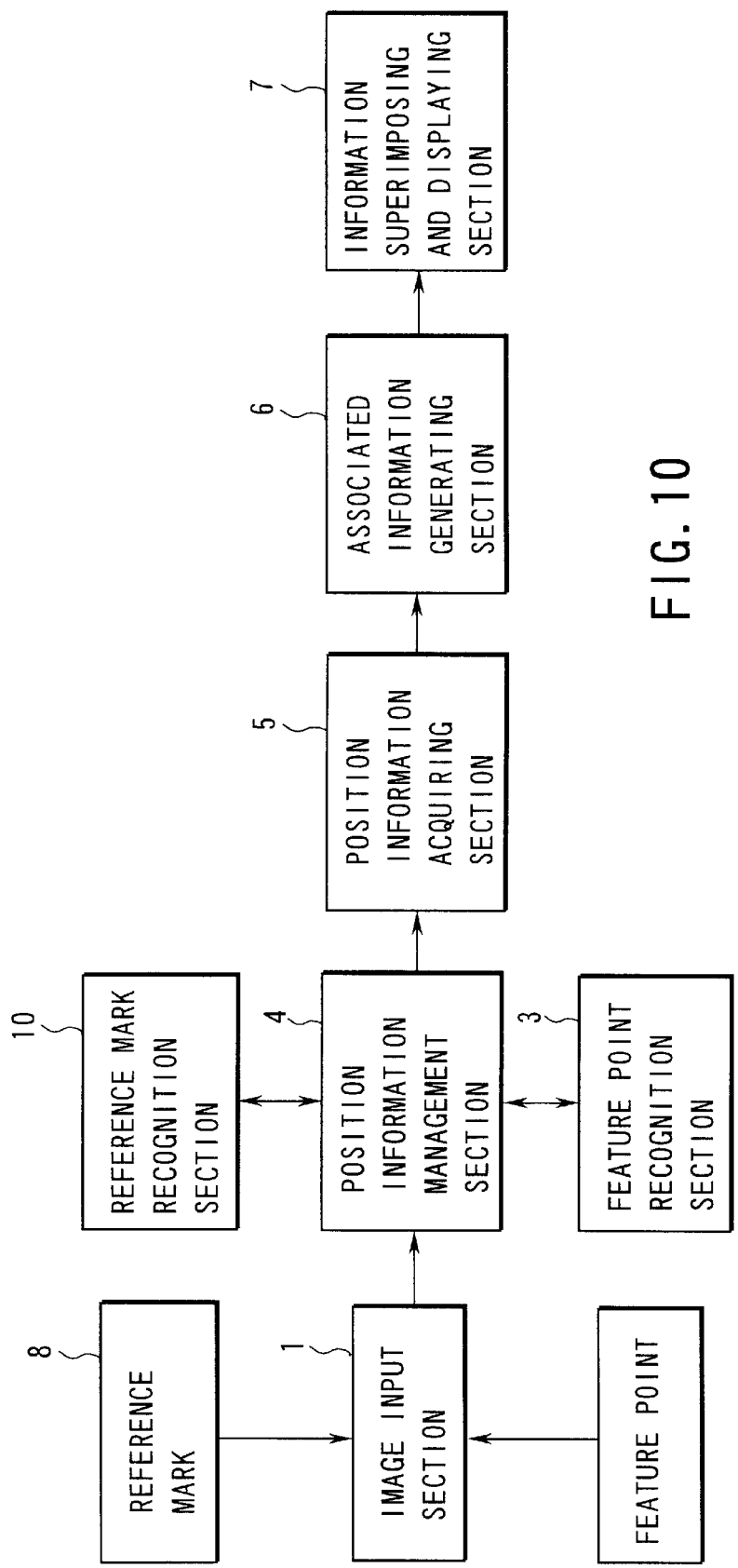
FIG. 10 is a block diagram depicting a configuration of an associated information presenting apparatus according to a fourth embodiment of the present invention.

FIG. 10 is a block diagram depicting a configure of an associated information presenting apparatus according to a fourth embodiment of the present invention.

As shown in FIG. 10, in the associated information presenting apparatus according to the fourth embodiment, the position information management section 4 first checks as to whether or not the reference mark 8 for indicating position information or the like in an input image is present based on image data inputted by means of the image input section 1.

Here, it is presumed that three or more feature points are present in the field of view.

In addition, although a pattern or two-dimensional pattern indicative of position and orientation information in the same way as in the third embodiment is unitized as a reference mark 8, the position and orientation information on the reference mark 8 and the size information on the reference mark 8 are recorded in advance. Unlike the first embodiment, it is presumed that the position and orientation information on the feature point 2 is not recorded.

In this case, position information (x0, y0, z0) formed in a square shape and recorded in the reference mark 8 is defined as the coordinate of points at the upper left corner of the mark.

In addition, if a length 'a' of one side is given to be size information on the reference mark 8, relative position information relative to the points at the other upper left corners can be obtained.

With respect to relative position information, when the respective upper left corner points are (0, 0, 0), the upper right corner point is (a, 0, 0), the lower left corner point (0, a, 0), and the lower right corner point is (a, a, 0).

These coordinate values of the relative coordinate system can be converted to the universal coordinate system by the matrix formula below.

$$\begin{bmatrix} X_{wp} \\ Y_{wp} \\ Z_{wp} \\ 1 \end{bmatrix} = L \cdot \begin{bmatrix} X_{lp} \\ Y_{lp} \\ Z_{lp} \\ 1 \end{bmatrix}$$

where ($x_{wp}$, $y_{wp}$, $z_{wp}$) denotes the universal coordinate value at the upper left corner point, and ($x_{lp}$, $y_{lp}$, $z_{lp}$) denotes the coordinate value of the relative coordinate system.

In addition, L denotes the following matrix formula.

$$L = \begin{bmatrix} Rot & \begin{matrix} t_x \\ t_y \\ t_z \end{matrix} \\ \begin{matrix} 0 & 0 & 0 \end{matrix} & 1 \end{bmatrix} = \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix}$$

where 'Rot' denotes the orientation in the universal coordinate system for the reference mark, and ($t_x$, $t_y$, $t_z$) denotes the coordinate value in the universal coordinate system for the upper left corner point.

The position and orientation of the image input section 1 are obtained by using this coordinate.

Then, the feature points in the field of view are associated with each other, and the positions of the feature points in the universal coordinate system are estimated.

A plurality of images that are successive in time series are employed for this estimation as disclosed in prior art.

In this duration, the reference mark must be within the field of view. Once the universal coordinate of the feature points is estimated, even if the reference mark is not within the field of view, the position and orientation of the image input section 1 are subsequently obtained as long as four or more feature points are present in the screen.

Hereinafter, the associated information can be superimposed and displayed in the same manner as in the third embodiment.

The image input section 1 and the associated information generating section 7 may not be always connected online.

That is, even if an image-acquired medium is employed as shown in a photograph, the position and orientation information on the image input section 1 is defined, thereby the associated information can be superimposed and displayed by superimposing the photograph.

Therefore, as has been described above, according to the third and fourth embodiments of the present invention, there can be provided an associated information presenting apparatus and an associated information presenting method in which the associated information to be superimposed can be determined at a high speed, and a reference point is detected, thereby making it possible to obtain the target position.

Fifth Embodiment

Figure 11:
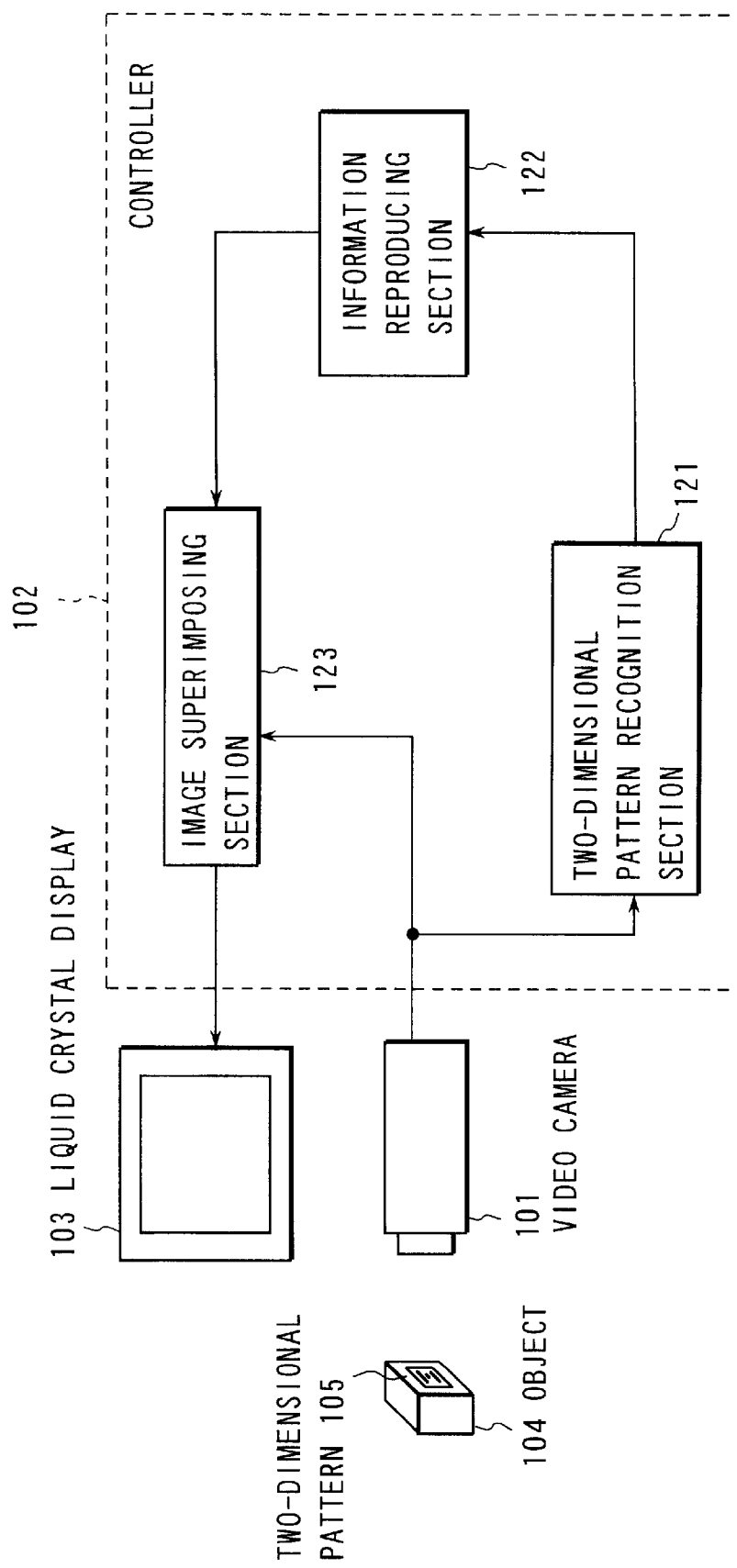
FIG. 11 is a block diagram depicting an information presenting apparatus according to fifth and sixth embodiments of the present invention.

FIG. 11 is a block diagram depicting a configuration of an information presenting apparatus according to a fifth embodiment of the present invention.

The information presenting apparatus according to the fifth embodiment of the present invention is configured as follows.

A video camera 101 (image input section), a controller 102, and a liquid crystal display 103 (image display section) are provided at this information presenting apparatus.

A two-dimensional pattern recognition section 121 (pattern recognition section), an information reproducing section 122, and an image superimposing section 123 are provided at the controller 102.

Images of a object 104 and a two-dimensional pattern 105 described later, which are acquired by means of the video camera 101, are supplied to a two-dimensional pattern recognition section 121 in the controller 102, and is supplied to the image superimposing section 123 in the controller 102.

An output from the two-dimensional pattern recognition section 121 is supplied to the information reproducing section 122.

An output from this information reproducing section 122 is supplied to the image superimposing section 123.

An output from this image superimposing section 123 is supplied to the liquid crystal display 103.

A two-dimensional pattern 105 is pasted to the object 104.

This two-dimensional pattern 105 is capable of recording information of 2000 bytes in 50 mm square region, and has an error correction function.

Figure 12:
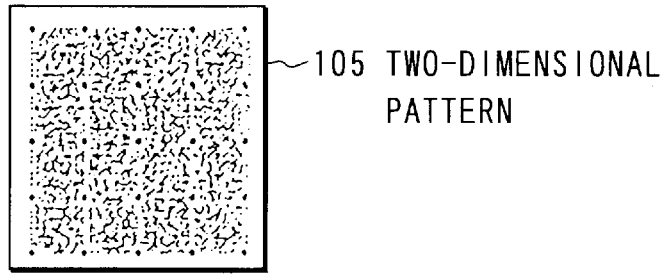
FIG. 12 is a view illustrating a two-dimensional pattern employed in the fifth embodiment of the present invention.

In this two-dimensional pattern 105, for example, as shown in FIG. 12, product information on the object 1004 in which the product name is digital camera, the manufacturing number is 99012345, the date of manufacture is 1990915, the price is 128,000 yen or the like is described as patterned information.

Now, an operation of an information presenting apparatus according to the fifth embodiment of the present invention will be described here.

Figure 14:
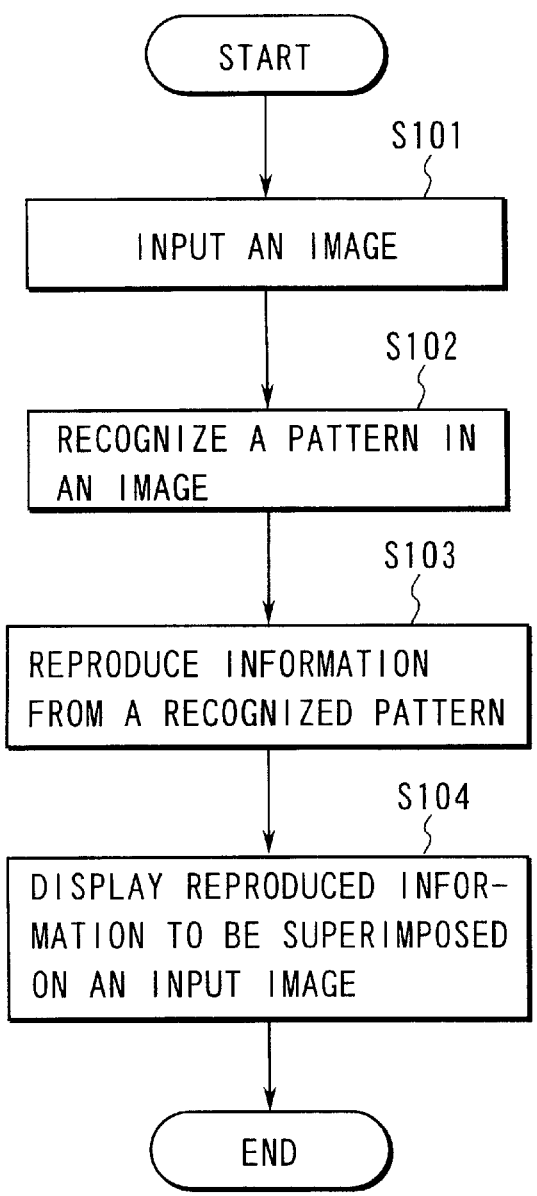
FIG. 14 is a flowchart illustrating procedures for a controller 2 to perform processing in the information presenting apparatus according to the fifth embodiment of the present invention.

FIG. 14 is a flowchart showing the procedures for the controller 102 to perform processing in the information presenting apparatus according to the present embodiment.

First, the user acquires an image of the object 104 and the two-dimensional pattern 105 by using the video camera 101 in the information presenting apparatus according to the present embodiment (step S101).

In this manner, an image acquired by the video camera 101 is binarized by means the two-dimensional pattern recognition section 121 in the controller 102, and then, a portion of the two-dimensional pattern 105 is extracted from among the binarized image, whereby pattern recognition of the portion of two-dimensional pattern 105 is performed (step S102).

Information on which pattern recognition is performed is supplied to an information reproducing section 122.

In this information reproducing section 122, text data or graphics data is generated based on the information on which pattern recognition is performed, thereby the generated data is converted into an image signal (step S103).

In this way, the information converted into the image signal by means of the information reproducing section 122 is supplied to the image superimposing section 123, and is superimposed with an image acquired by the video camera 101.

The image superimposed by this image superimposing section 123 is supplied to the liquid crystal display 103, and is presented to the user (step S104).

Figure 13:
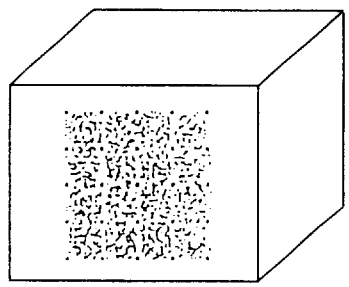
FIG. 13 is a view illustrating a superimposition image presented to a user by the information presenting apparatus according to the fifth embodiment of the present invention.

Therefore, as shown in FIG. 13, an image on which product information on the object 104 containing the product name of digital camera, the manufacturing number of 99012345, the date of manufacture of 19990915, the price of 128,000 yen or the like is superimposed on an image acquired by the video camera 101 is presented to the user on the liquid crystal display 103.

According to the fifth embodiment of the present invention, the image display section is adopted to display an image on which an image from the image input section is superimposed with information reproduced by the pattern recognition section and the information reproducing section. Thus, there is no need to assign identification ID to each object, even if special database for storing information to be displayed is not provided, an inputted image and the information contained in the inputted image are displayed in a superimposed manner, making it possible to present them to the user.

In each configuration of the present embodiment, of course, various modifications and change can occur.

For example, although the image input section corresponds to the video camera 101 in this embodiment, any other device may be employed as long as it can input an image.

Although the pattern recognition section corresponds to the two-dimensional pattern recognition section 121 in the controller 102 in the present embodiment, a one-dimensional pattern recognition device or any other device may be employed as long as it can recognize a pattern.

In addition, although the information reproducing section corresponds to the information reproducing section 122 in the controller 102 in the present embodiment, any device may be employed as long as it can reproduce information.

Further, although the image superimposing section corresponds to the image superimposing section 123 in the controller 102 in the present embodiment, a video mixer or any other device may be employed as long as it can superimpose an image.

Furthermore, although the image display section corresponds to the liquid crystal display 103 in the present embodiment, a CRT, a plasma display or any other device may be employed as long as it can display an image.

Sixth Embodiment

Now, an information presenting apparatus according to a sixth embodiment of the present invention will be described below.

The configuration of the sixth embodiment is the same as that of the fifth embodiment shown in FIG. 11, and a description will be given by using like reference numbers shown in FIG. 11.

A video camera 101 (image input section), a controller 102, and a liquid crystal display 103 (image display section) are provided at this information presenting apparatus.

A two-dimensional pattern recognition section 121 (pattern recognition section), an information reproducing section 122, and an image superimposing section 123 are provided at the controller 102.

Images of the object 104 and the two-dimensional pattern 105 described later, which are acquired by means of the video camera 101, are supplied to a two-dimensional recognition section 121 in a controller 102, and is supplied to an image superimposing section 123 in the controller 102.

An output from the two-dimensional pattern recognition section 121 is supplied to an information reproducing section 122.

An output from this image reproducing section 122 is supplied to the image superimposing section 123.

An output from this image superimposing section 123 is supplied to a liquid crystal display 103.

A two-dimensional pattern 105 is pasted to the object 104.

This two-dimensional pattern 105 is capable of recording information of 2,000 bytes in a 50 mm square region, for example, and has an error correction function.

Figure 15:
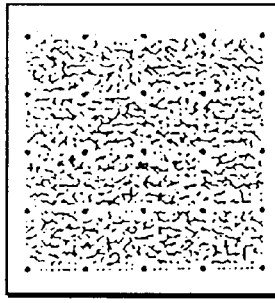
FIG. 15 is a view illustrating a two-dimensional pattern employed in an information presenting apparatus according to the sixth embodiment of the present invention.

In this two-dimensional pattern 105, as shown in FIG. 15, for example, information on the object 104 containing product name of digital camera (FONT: 14, COLOR: BLACK), manufacturing number of 99012345 (FONT: 10, COLOR: BLACK), date of manufacture of 19990915 (FONT: 14, COLOR: BLACK), price of 128,000 yen (FONT: 14, COLOR: RED) and information such as display color and character size (FONT and COLOR parenthesized above) that is attribute information by each item of information are recorded as patterned information, respectively.

Now, an operation of the information presenting apparatus according to the sixth embodiment of the present invention will be described here.

Figure 17:
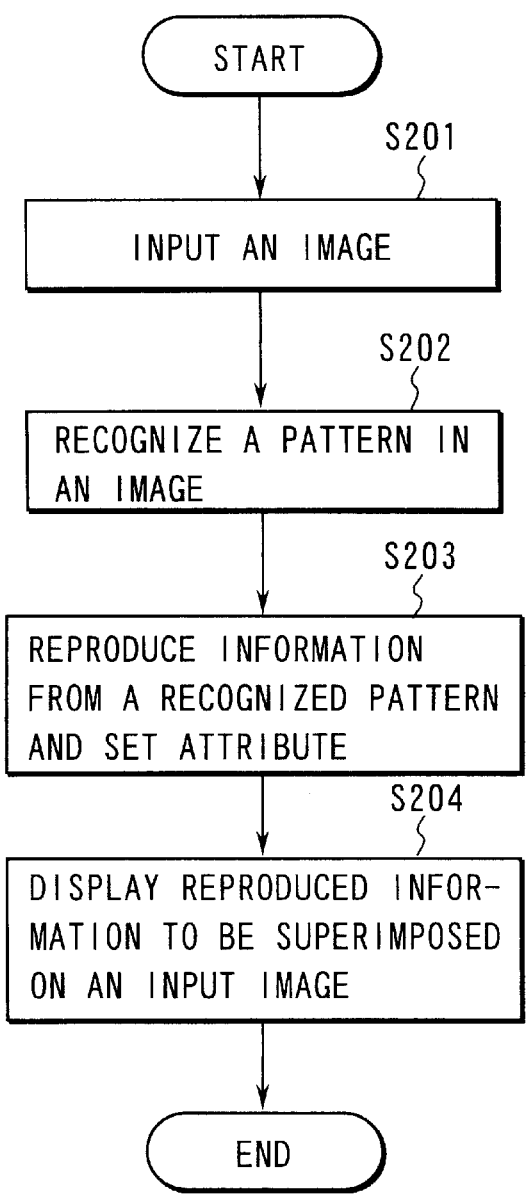
FIG. 17 is a flowchart illustrating procedures for the controller 2 to perform processing in the information presenting apparatus according to the sixth embodiment of the present invention.

FIG. 17 is a flowchart for illustrating the procedures for a controller 102 to perform processing in the information presenting apparatus according to the present embodiment.

First, the user acquires an image of the object 104 and the two-dimensional pattern 105 by employing the video camera 101 in the information presenting apparatus according to the present embodiment (step S201).

In this manner, an image acquired by the video camera 101 is binarized by the two-dimensional recognition section 121 in the controller 102, and then, a portion of the two-dimensional pattern 105 is extracted from among the binarized image, whereby pattern recognition of the portion of the two-dimensional pattern 105 is performed (step S202).

Then, information on which pattern recognition is performed is supplied to the information reproducing section 122.

In this information reproducing section 122, text data or graphics data is generated based on the information on which pattern recognition is performed, and the display color and character size is set by each items of information based on attribute information, whereby the generated data is converted into an image signal (S203).

In this way, the information converted into the image signal by means of the information reproducing section 122 is supplied to the image superimposing section 123, and is superimposed with an image acquired by the video camera 101.

The image superimposed by this image superimposing section 123 is supplied to the liquid crystal display 103, and is presented to the user (step S204).

Figure 16:
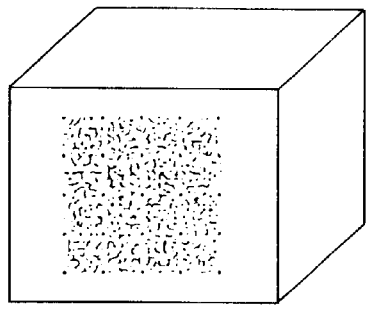
FIG. 16 is a view illustrating a superimposition image presented to the user by the information presenting apparatus according to the sixth embodiment of the present invention.

Therefore, as shown in FIG. 16, an image on which product information on the object 104 containing the product name of digital camera, the manufacturing number of 99012345, the date of manufacture of 19990915, the price of 128,000 yen or the like is superimposed on an image acquired by the video camera 101 as display color and font size set for each item of information is presented to the user on the liquid crystal display 103.

According to the sixth embodiment of the present invention, the image display section is adopted to display an image on which an image from the image input section is superimposed with information reproduced by the pattern recognition section and the information reproducing section. Thus, there is no need to assign identification ID to each object, even if special database for storing information to be displayed is not provided, an inputted image and the information contained in the inputted image are displayed in a superimposed manner, making it possible to present them to the user.

In each configuration of the present embodiment, of course, various modifications and change can occur.

For example, although the image input section corresponds to the video camera 101 in this embodiment, any other device may be employed as long as it can input an image.

Although the pattern recognition section corresponds to the two-dimensional pattern recognition section 121 in the controller 102 in the present embodiment, a one-dimensional pattern recognition device or any other device may be employed as long as it can recognize a pattern.

In addition, although the information reproducing section corresponds to the information reproducing section 122 in the controller 102 in the present embodiment, any device may be employed as long as it can reproduce information.

Further, although display color and font size are set for each item of information with respect to attribute information, an absolute display position on the screen, relative display position information with respect to the two-dimensional pattern may be employed.

Further, although the image superimposing section corresponds to the image superimposing section 123 in the controller 102 in the present embodiment, a video mixer or any other device may be employed as long as it can superimpose an image.

Furthermore, although the image display section corresponds to the liquid crystal display 103 in the present embodiment, a CRT, a plasma display or any other device may be employed as long as it can display an image.

As has been described above, according to the fifth and sixth embodiments of the present invention, there can be provided an information presenting apparatus and an information presenting method in which there is no need to assign an identification ID by each object, and further, object information can be presented to the user even if a database for storing all the display information is absent.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information display member having an information display face of its known size, said information display member comprising:
   a first pattern displayed on said information display face in order to represent patterned coordinate information indicative of a position of said information display member; and
   a second pattern displayed on said information display face in order to represent patterned direction information indicative of a direction in which said information display face is oriented.

2. An information display member according to claim 1, wherein said coordinate information is directed to latitude and longitude.

3. An information display member according to claim 1, wherein said information display face has a side face section, and information indicative of a direction in which said side face section is oriented is displayed at said side face section.

4. An information display member according to claim 1, further comprising:
   a third pattern displayed on said information display face in order to represent patterned height information indicative of a height of said information display member; and
   a fourth pattern displayed on said information display face in order to represent patterned vertical and horizontal directions of said information display member.

5. An information display member according to claim 4, wherein at least one of said first to fourth patterns expresses information according to disposition of regions with their two different densities.

6. An information display member according to claim 4, wherein at least one of said first to fourth patterns displays a character or a character describing information represented by each of said patterns together with the patterns.

7. A position detecting method comprising the steps of:
acquiring an image by acquiring the information display member displayed on the information display face with a camera by a first pattern for patterning and representing coordinate information indicative of a position of an information display member having an information display face of its known size and a second pattern for patterning and representing direction information indicative of a direction oriented on the information display face;
obtaining a length ratio of aspect on the information display face mapped on the image and a direction in which the camera is oriented from direction information displayed on the information display face;
obtaining a distance between the camera and the information display face from the size of the information display face mapped on the image; and
obtaining the position coordinate of the camera from the direction in which the camera is oriented, the distance, and the coordinate information displayed on the information display face.

8. An position detecting method according to claim 7, wherein a third pattern for patterning and representing height information indicative of a height of said information display member and a fourth pattern for patterning and representing the vertical and horizontal directions of said information display member are displayed on said information display face of said information display member,
said position detecting method further comprising the steps of:
obtaining height information displayed on an information display face mapped on said image; and
obtaining a height of said camera from said height information and an elevation angle of said camera.

9. An information display member, wherein said information display member is formed in a flat plate shape or a curved face plate shape expressing patterned information by using a combination of geometrical shapes and a combination of colors, and spatial position information and/or direction information is contained in the contents of the patterning expression information.

10. An information display member according to claim 9, wherein a combination of geometrical shapes of said information display member is mainly expressed in binary number.

11. An information display member according to claim 9, wherein said information display member is composed of an electronic display body, and a display patterning information can be changed freely by electrical signal operation.

12. An information display member according to claim 9, wherein the spatial position information and/or direction information on said information display member consists of characters indicative of longitude, latitude, direction, height, and size of the information display member.

13. A position and orientation detecting method, comprising the steps of:
acquiring an image relative to an outer frame of an information display member or external shapes thereof formed in a flat plate shape or curved face plate shape expressing patterning information by using a combination of geometrical shapes and a combination of colors, and including the spatial position information and/or direction information in the contents of the patterning and expression information, and a combination of geometrical patterns that designates the information display member position expressed in the information display member; and
computing a distance from a ratio of a real size of the known information display member to a size of the information display member image-acquired together with an image angle of said image acquisition apparatus, thereby to know the image acquisition position.

14. A position and orientation detecting method according to claim 13, wherein an elevation angle of said image acquisition apparatus is estimated by using the display information on which the vertical upward or downward directions and horizontal direction and orientation are displayed in an information display face of said information display member, and a height difference between said image acquisition position and said information display member is obtained from the already computed distance information.

15. An associated information presenting apparatus for superimposing and displaying associated information on each section of said object at the corresponding position on an image on which an object is image-acquired, said apparatus comprising:
an image input section for including in an image acquisition range a mark on which a pattern representing position information on four or more points of said object is displayed, thereby inputting an image on which said object is image-acquired;
a position information management section for reading said pattern from an image inputted from said image input section, thereby acquiring said position information;
a position information acquisition section for obtaining the position and orientation of said image input section from the acquired position information acquired by said position information management section;
an associated information generating section for obtaining the position of each section of each object on said image based on the position and orientation of said image input section obtained by said position information acquisition section; and
an information superimposing and displaying section for superimposing and displaying said associated information at the corresponding position based on the position on said image obtained by said associated information generating section.

16. A position and orientation detecting method according to claim 15, wherein position information on said mark itself is contained in position information on four or more points represented by said pattern displayed on said mark.

17. A method for superimposing and displaying the associated information on each section of said object at the corresponding position on an image on which an object is image-acquired, said method comprising the steps of:
including in an image acquisition range a mark on which a pattern representing position information on four or more points of said object is displayed, thereby inputting an image on which said object is image-acquired by an image input section;
reading said pattern, thereby acquiring said position information;

obtaining the position and orientation of said image input section from said position information;

obtaining a position on said image of each section of said object from the position and orientation of said image input section; and superimposing and displaying said associated information at the corresponding position based on the position on said image.

18. An associated information presenting apparatus for superimposing and displaying the associated information on each section of said object at the corresponding position on an image on which an object is image-acquired, said apparatus comprising:

an image input section for including in an image acquisition range a mark on which a pattern representing position information on four or more points of said object is displayed, thereby inputting an image on which said object is image-acquired;

a position information management section for reading said pattern, thereby acquiring said position information;

a position information acquisition section for obtaining the position and orientation of said image input section from said position information;

an associated information generating section for obtaining a position on said image of each section of said object from the position and orientation of said image input section; and an information superimposing and displaying section for superimposing and displaying said associated information at the corresponding position based on the result of said associated information generating section.

19. An associated information presenting apparatus according to claim 18, wherein position information on said mark itself is contained in position information on four or more points represented by said pattern displayed on said mark.

20. An associated information presenting apparatus for superimposing and displaying the associated information on each section of an object at the corresponding position on an image on which said object is image-acquired, said apparatus comprising:

an image input section for image-acquiring said object, thereby inputting an image;

a position information management section for storing position information on four or more points of said object predetermined from a plurality of images on which the position and orientation of an image input section are known;

a position information acquisition section for obtaining the position and orientation of said image input section from said position information;

an associated information generating section for obtaining a position on said image of each section of said object from the position and orientation of said image input section; and an information superimposing and displaying section for superimposing and displaying said associated information at the corresponding position based on the result of said associated information generating section.

21. An associated information presenting apparatus according to claim 20, wherein the position and orientation of the image input section in said plurality of images are obtained by including in an image acquisition range a mark on which a pattern representing the size of, and position information on, the mark is displayed; and image-acquiring an object at said image input section; reading said pattern, thereby acquiring the size of, and position information on, the mark; and using the thus acquired size of, and position information of, the mark.

22. An associated presenting apparatus comprising:

an image input section;

a mark recognition section for recognizing a mark in an input image from the image input section, thereby acquiring position information on the mark included in the recognized mark;

a feature point recognition section for recognizing a feature point in a screen;

a position information management section for performing association with the mark acquired by said mark recognition section in advance, thereby acquiring position information corresponding to the feature point in the screen recognized by the feature point recognition section;

a position information acquisition section for acquiring position and orientation information on said image input section from position information on the feature point acquired by a mark and/or position information management section acquired by said mark recognition section;

an associated information generating section for generating associated information in a field of view for an input image based on the position and orientation information acquired by said position information acquiring section; and a superimposing and displaying section for superimposing and displaying on an input image the associated information generated by said associated information generating section.

23. An associated information presenting apparatus according to claim 22, wherein a feature point for performing said association is not created to be intentionally employed as a mark.

24. An associated information presenting apparatus according to claim 22, wherein a plurality of feature points are subjected to said association.

25. An associated information presenting apparatus according to claim 22, wherein said position information acquisition section employs a mark that contains one feature point and a mark that contains a plurality of feature points.

26. An associated information presenting apparatus comprising:

an input section for inputting an image;

a feature point recognition section for recognizing a feature point in a screen on which an image inputted by the input section is displayed;

a mark recognition section for recognizing a mark in the image inputted from said input section, thereby acquiring position information on the mark included in the recognized mark;

a position information management section for performing association with position information on a mark acquired by said mark recognition section in advance, thereby acquiring position information corresponding to the feature point in the screen recognized by said feature point recognizing section;

an orientation information acquisition section for acquiring position and orientation information on said input section from position information on a mark and/or a feature point;

an associated information generating section for generating associated information in a field of view for an image based on the position and orientation information acquired by said orientation information acquisition section; and a superimposing and displaying section for superimposing and displaying the associated information generated by said orientation information acquiring section on an image inputted by said input section.

27. An associated information presenting apparatus according to claim 26, wherein a feature point for performing said association is not created to be intentionally employed as a mark.

28. An associated information presenting apparatus according to claim 26, wherein a plurality of feature points are subjected to said association.

29. An associated information presenting apparatus according to claim 26, wherein said position information acquisition section employs a mark that contains one feature point and a mark that contains a plurality of feature points.

30. An information presenting apparatus comprising:

an image input section for inputting an image;

a pattern recognizing section for recognizing a pattern representing information in an image inputted by said image input section;

an information reproducing section for reproducing information represented by a pattern recognized by said pattern recognition section;

an image superimposing section for superimposing information reproduced by said information reproducing section in an image inputted by said image input section; and an image display section for displaying an output from said image superimposing section.

31. An information display apparatus according to claim 30, wherein said information reproducing section is adopted to set an information display attribute based on display attribute information contained in information reproduced by the information reproducing section.

32. An information presenting method comprising the steps of:

inputting an image;

recognizing a pattern representing information in an input image reproducing information represented by a recognized pattern;

superimposing reproduced information on said input image; and displaying an image on which said reproduced information is superimposed.

33. An image presenting apparatus comprising:

an image input section for inputting an image;

a pattern recognition section for recognizing a predetermined pattern in an image inputted by said input image section;

an information reproducing section for reproducing predetermined pattern information recognized by said pattern recognition section;

an image superimposing section for superimposing information reproduced by said information reproducing section on an image inputted by said image input section; and an image display section for displaying an output from said image superimposing section.

34. An information presenting method according to claim 33, wherein said information reproducing section is adopted to set an information display attribute based on display attribute information contained in reproduced information.

35. An associated information presenting apparatus for superimposing and displaying the associated information on each section of said object at the corresponding position on an image on which said object is image-acquired, said apparatus comprising:

image input means for including in an image acquisition range a mark in which a pattern representing position information on four or more points of said object is displayed, thereby inputting an image on which said object is image-acquired;

position information management means for reading said pattern from an image inputted by said image input means, thereby acquiring said position information;

position information acquiring means for obtaining the position and orientation of said image input means from acquisition position information acquired by said position information management means;

associated information generating means for obtaining a position on said image of each section of said object based on the position and orientation of said image input means obtained by said position information acquiring means; and information superimposing and displaying means for superimposing and displaying said associated information at the corresponding position based on the position on said image obtained by said associated information generating means.

36. An associated information presenting apparatus for superimposing and displaying the associated information on each section of said object at the corresponding position on an image on which said object is image-acquired, said apparatus comprising:

image input means for including in an image acquisition range a mark on which a pattern representing position information on four or more points of said object is displayed, thereby inputting an image on which said object is image-acquired;

position information management means for reading said pattern, thereby acquiring said position information;

position information acquiring means for obtaining the position and orientation of said image input means from said position information;

associated information generating means for obtaining a position on said image of each section of said object from the position and orientation of said image input means; and information superimposing and displaying means for superimposing and displaying said associated information at the corresponding position based on the result of said associated information generating means.

37. An associated information presenting apparatus for superimposing and displaying the associated information on each section of said object at the corresponding position on an image on which said object is image-acquired, said apparatus comprising:

image input means for acquiring said object, thereby inputting an image;

position information management means for storing position information on four or more points of said object predetermined from a plurality of images on which the position and orientation of image input means are known;

position information acquiring means for obtaining the position and orientation of said image input means from said position information;

associated information generating means for obtaining a position on said image of each section of said object from the position and orientation of said image input means; and information superimposing and displaying means for superimposing and displaying said associated information at the corresponding position based on the result of said associated information generating means.

38. An associated information presenting apparatus, comprising:

image input means;

mark recognition means for recognizing a mark in an input image from the image input means, thereby acquiring position information on the mark included in the recognized mark;

feature point recognition means for recognizing a feature point in a screen;

position information management means for performing association with a mark acquired by said mark recognition means, thereby acquiring position information corresponding to the feature point in the screen recognized by the feature point recognition means;

position information acquiring means for acquiring the position and orientation information on said image input means from position information on a feature point acquired by a mark acquired by said mark recognition means and/or said position information management means;

associated information generating means for generating information associated with the inside of the field of view for an input image based on the position and orientation information acquired by said position information acquiring means; and superimposing and displaying means for superimposing and displaying on an input image the associated information generated by said associated information generating means.

39. An associated information presenting apparatus comprising:

image input means;

feature point recognition means for recognizing a feature point in a screen in which an image inputted by said input means is displayed;

mark recognition means for recognizing a mark in an input image from the image input means, thereby acquiring position information on the mark included in the recognized mark;

position information management means for performing association with a mark acquired by said mark recognition means, thereby acquiring position information corresponding to the feature point in the screen recognized by the feature point recognition means;

position information acquiring means for acquiring the position and orientation information on said input means from position information on a mark and/or a feature point;

associated information generating means for generating information associated with the inside of the field of view based on position and orientation information acquired by said position information acquiring means; and superimposing and displaying means for superimposing and displaying associated information generated by said associated information generating means on an image inputted by said input means.

40. An information presenting apparatus comprising:

image input means for inputting an image;

pattern recognition means for recognizing a pattern presenting information in an image inputted by said image input means;

information reproducing means for reproducing information representing a pattern recognized by said pattern recognition means;

image superimposing means for superimposing information reproduced by said information reproducing means on an image inputted by said image input means; and image display means for displaying an output from said image superimposing means.

41. An information presenting apparatus comprising:

image input means for inputting an image:

pattern recognition means for recognizing a predetermined pattern in an image inputted by said image input means;

information reproducing means for reproducing predetermined pattern information recognized by said pattern recognition means;

image superimposing means for superimposing information reproduced by said information reproducing means on an image inputted by said image input means; and image display means for displaying an output from said image superimposing means.

\* \* \* \* \*